United States Patent [19]

Young

[11] Patent Number: 5,046,878

[45] Date of Patent: Sep. 10, 1991

[54] REINFORCING BAR COUPLING SYSTEM

[75] Inventor: Brian W. Young, Altrincham, England

[73] Assignee: Metal-Bond (Technology) Limited, Stockport, United Kingdom

[21] Appl. No.: 463,457

[22] Filed: Jan. 11, 1990

[30] Foreign Application Priority Data

Jun. 5, 1989 [EP] European Pat. Off. ............ 89305638
Jun. 5, 1989 [GB] United Kingdom ................. 8912911
Jun. 15, 1989 [AU] Australia ............................ 36388/99
Jun. 19, 1989 [CA] Canada ................................. 603272

[51] Int. Cl.$^5$ ........................... B25G 3/00; F16D 1/00
[52] U.S. Cl. ........................................ 403/13; 403/265
[58] Field of Search ............... 403/268, 266, 267, 265, 403/269, 306, 362, 13

[56] References Cited

U.S. PATENT DOCUMENTS 1,689,281 10/1928 Forssell ................................ 403/265
4,666,326 5/1987 Hope ................................ 403/265 X

FOREIGN PATENT DOCUMENTS 631786 11/1949 United Kingdom .

Primary Examiner—Andrew V. Kundrat
Attorney, Agent, or Firm—Arnold J. Ericsen; C. Thomas Sylke

[57] ABSTRACT

A coupling fitting for making joints in reinforcing bars or wires for structural concrete aims to provide a mechanical strength of the coupling virtually equal to the full design strength while providing the ability to increase the strength upto and beyond ultimate tensile strength of the rebar by the addition of resin. To that end the coupling comprises a sleeve for fitting in spaced relation around adjacent portions of rebars to be joined and having positively adjustable engagers threaded through the wall of the sleeve, and profiled engagers to engage said portions. The engagers serve for centering the rebars and the profiling serves to provide a key preferably with both the sleeve and the rebar. It is also preferred to have the positively adjustable engagers configured to bite into the rebars. The spaced relation affords provision for introducing settable resin.

24 Claims, 2 Drawing Sheets

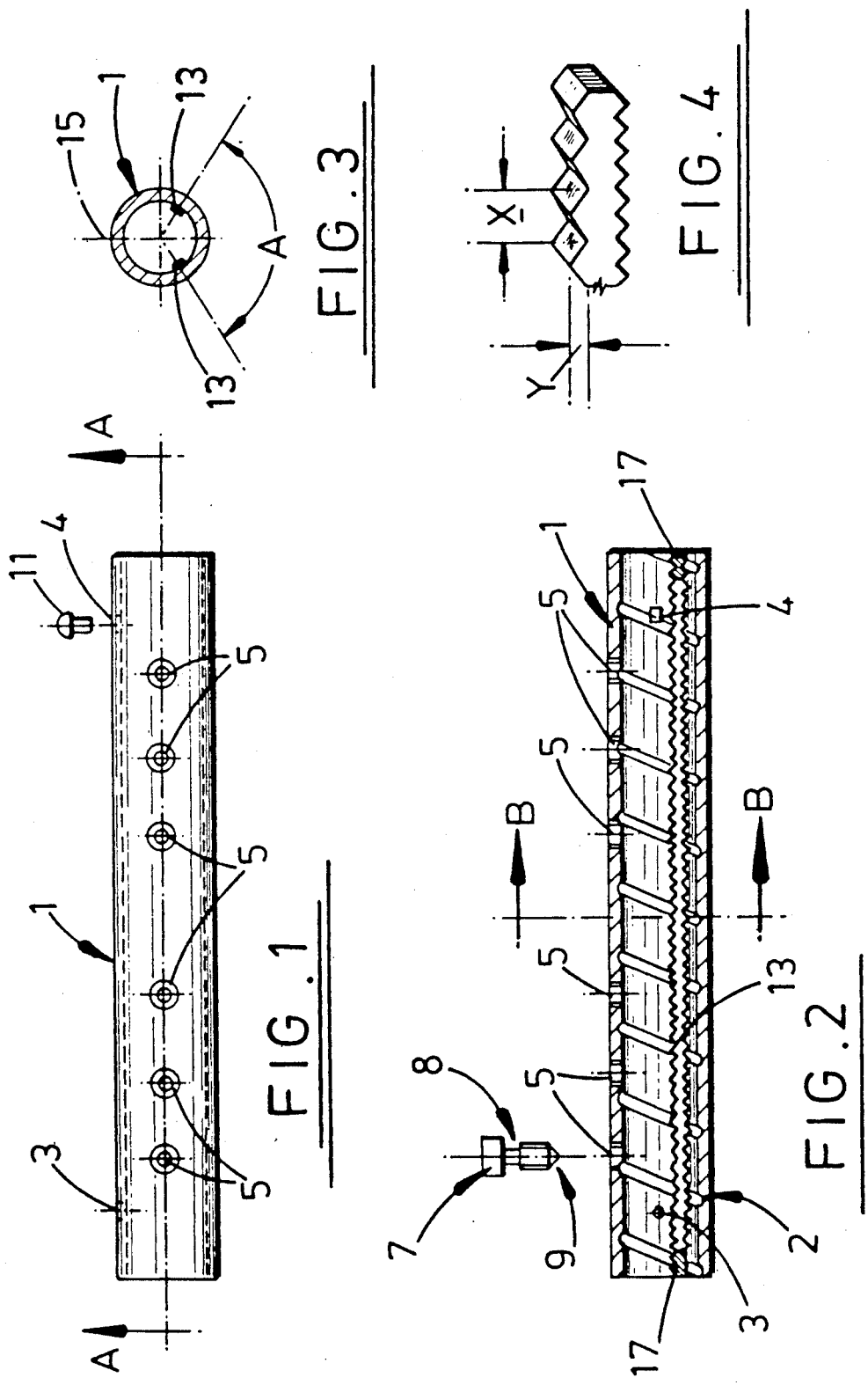

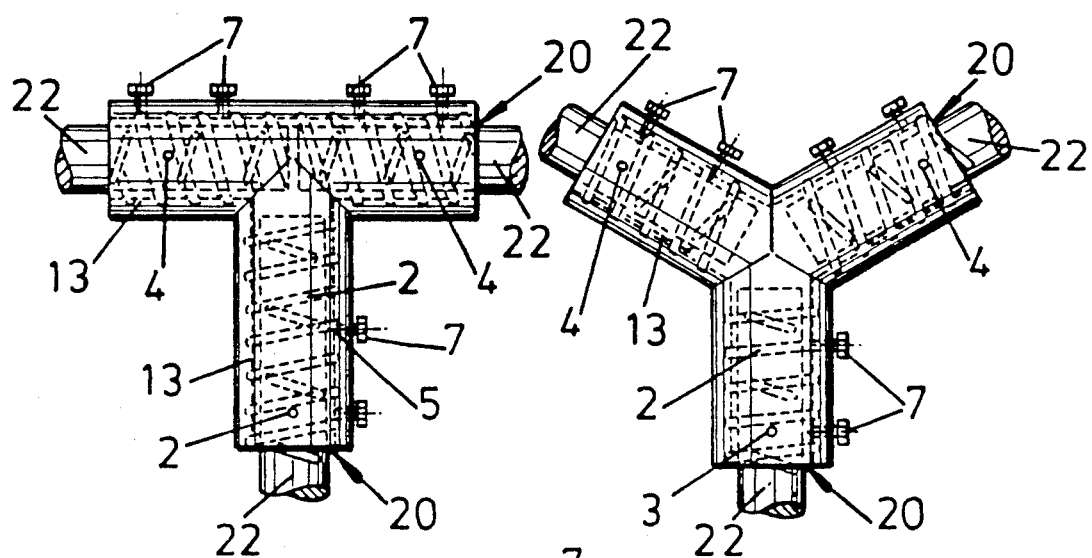
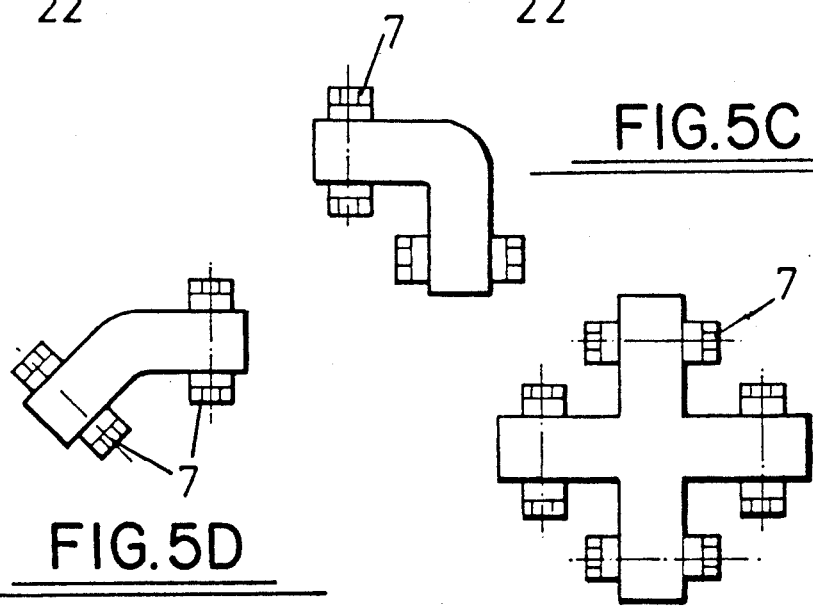

REINFORCING BAR COUPLING SYSTEM

The present invention relates to the coupling of reinforcing bars and is particularly but not exclusively concerned with end-coupling and fixing reinforcing bars, usually of steel, for use in structural concrete or the like.

In our British Pat. No. 2127512B we describe a reinforcing bar coupling system in which a settable material (resin) is applied about adjacent bars in end to end relationship, at a desired joint or junction, within a material retaining sleeve having spacing means for its fitting about said ends. The spacing means comprises radially spaced engagers at least one of which is positively adjustable through the sidewall, wherein at emplacement the sleeve is centred relative to said bars. In one embodiment, the positively adjustable engager comprises a screw threaded bolt with two other engagers as a pair of ribs or nibs.

In joining reinforcing bars, the aim is to achieve a joint strength at least equal to the ultimate tensile strength of the reinforcing bar. In fact with the aforedescribed construction we were able to achieve that by the strength of the settable material alone. Some additional strength was provided by the mechanical effect of the centring means but that amounted to only 10% of the total strength of the joint.

Because resin will creep when subject to long term stress, and because the strength of the resin falls off with high temperature, in certain instances it may be advantageous to utilise a mechanical fixing means which itself provides virtually the full design strength whilst preferably also providing the resin to increase the strength up to or beyond the ultimate tensile strength of the rebar. The provision of such mechanical strength can serve to ensure that the maximum design load can be sustained in fire resistance tests.

It is an aim of the present invention to provide a coupling fitting for reinforcing bars or wires for structural concrete providing increased mechanical strength.

According to the present invention then there is provided a coupling fitting for making joints in reinforcing bars or wires for structural concrete, comprising a sleeve-like device having means for locating it over and about portions of said bars or wires adjacent said desired joint with clearance to said bar or wire portions, wherein the means for locating comprises for each portion engagers at radial spacings relative to axes of bars or wires to be joined, one of which engagers for each portion is positively adjustable at emplacement through the sidewall of the device, and the other engagers comprise radially spaced ribs, and wherein those ribs are profiled to key into the bars or wires portions.

The profiling of the ribs aids in achieving the design strength by way of a mechanical connection of the bars or wires. We prefer to provide said ribs at at least two circumferential spaced positions around the sleeve. Preferably, the ribs comprise longitudinal strips, which for a straight sleeve (for a straight connection of two bars) may run substantially the length of the sleeve.

Means may be provided for physically spacing the ribs at desired circumferential spacings within the sleeve, usually opposite to the positively adjustable engager. Such means may comprise a cage-like structure such as by small diameter wire or rod spacers simply postioned between or physically secured to two ribs.

Even simpler still, the ribs may be secured to the inner wall of the sleeve at desired circumferential spacing by adhesive, or by tack welding at the or each end of the sleeve. Utilising a soft welding technique ensures that all the profiling (e.g. teeth) sink into the bars or wires for the entire length of the ribs and that the ribbed engagers move outwardly into the sleeve wall in a uniform manner.

As an alternative means of locating the ribs, the sleeve may be splined longitudinally to receive the ribs. Such splining may provide for radial location of the ribs by appropriate cross-sectioning i.e. with a mouth narrower than the root.

We prefer to provide the ribs in pairs and with a preferred spacing where only one pair is provided of 120 degrees so making for equal spacing with the positively adjustable engager. We prefer the pairs of ribs to be disposed symmetrically about the axis of the positive engager, but on the opposite half of the sleeve. In practice, we envisage a minimum angle between pairs of ribs of 100 degrees and a maximum of 180 degrees although, smaller angles may be used. In practice we find that one pair is perfectly satisfactory and enables load to be achieved easily.

We find it particularly convenient if opposite sides of the ribs are profiled, i.e. both the side which contacts the inner surface of the sleeve and the side which contacts the reinforcing bar. This inhibits longitudinal movement of the ribs and hence improves mechanical strength. We find that profiling in the nature of ridges and valleys alternating along the length of the rib are particularly effective especially when, in the form of pointed teeth, say triangular, usually with flanks angled symmetrically about a perpendicular to the base. We have experimented with fine and coarse profiles and prefer to have the base dimension of the teeth greater than the height. We have found base to height ratios of 3 to 1 and 2 to 1 particularly effective.

More particularly, we prefer to harden the ribs, so that they are greater than the hardness of the reinforcing bars and the sleeve. The commonly used ribbed reinforcing bars have a hardness of 110 Vickers and we prefer the sleeve to have the same hardness. A profile hardness in the range 250-400 Vickers is suitable and we have found that a profile hardness of 300 Vickers gives optimum reuslts. The hardening can be by any convenient means usually by heating to 850 degrees C and cooling in either water or oil depending on the degree of hardness. Heating in a nitrogen atmosphere gives a preferred quality of hardness. Work hardening alone gives a hardness of 120 Vickers and this may be satisfactory in certain applications such as with mild steel reinforcing bars (usually non-ribbed) which are of lower hardness.

The profiling gives indentation of the ribs into the reinforcing bar and/or the sleeve at a plurality of positions along the length of the rib, and it is these indentations which effectively produce a plurality of mechanical connections along the length of the coupling, producing significant increases in mechanical strength, compared with our previous construction which did not utilise mechanical keying of the ribs. The hardening of the ribs gives rise to penetration to thereby ensure adequate keying. Tensile tests to destruction on the couplings have shown that the ribs remain intact with the surface of the reinforcing bar being scoured by the teeth.

We find it particularly advantageous to use as the positively adjustable engagers for each portion at least one screw or bolt threaded through the wall of the sleeve. We have found that it is particularly important that the wall thickness of the sleeve is such that it avoids canting of the bolt in the bore under load. It is especially advantageous to have the engagers configured to bite into the reinforcing bars. We find that a point or indent to the end of the bolt is useful in this regard so as to provide a biting point or edge. A conical end or annular edge to the screw or bolt gives keying into the surface of the reinforcing bar and this can contribute in the region of 60% of the mechanical strength, with the keying of the ribs providing of the order of 40% of the mechanical strength.

At emplacement with the sleeve about the bars or wires, the screw/bolt is done up so as to both centre the bars relative to the sleeve and to get the desired mechanical keying. To avoid generating stress raisers in the concrete which will ultimately surround the coupling, we prefer to use bolts which shear off at a predetermined torque with the break as close as possible to the outer wall of the sleeve to avoid loss of thread length but without projecting significantly beyond the sleeve wall to create a possible stress raiser. The torque is selected in relation to the size of coupling to give the desired mechanical strength. We have tried using further pointed adjustable engagers in place of the ribs but find it is almost invariably impossible to get at the bolt heads on-site to do these up. Accordingly using one pair of ribs and positively adjustable engagers at one circumferential location particularly advantageous.

The length of the couplings and the number of positive engagers per portion of bar is chosen independence upon the size of bar or wire being joined and/or in relation to the maximum design load. The two factors may be equated one with the other depending on the safety factor. Three bolts per portion is typical for 10-12 mm bar. We have couplings to cover bars from 10 mm to 40 mm diameter, utilising bolt diameters of 6 mm to 24 mm. Bolts are usually 12.9 high tensile steel.

We prefer to use our sleeve-like coupling device with a settable material as described in our aforesaid patent so that we can have a mechanical strength at least equal to the design strength, whilst the total strength of the coupling with resin is equal to 1.3 fy, where (fy) is the ultimate tensile strength of the reinforcing bar.

Accordingly the invention also provides a method of coupling reinforcing bars or wires for subsequent embedment in concrete for structural purposes, the method comprising applying about adjacent bar or wire portions at a desired joint or junction a sleeve having locating means for its fitting about said portions in spaced relation thereto, the locating means comprising for each portion radially spaced engagers, at least one of which for each portion is positively adjustable through the side wall of the sleeve and others of which comprise profiled ribs, and wherein at emplacement the sleeve is centred relative to each of said portions to be joined by adjustment of said at least one positively adjustable engagers to give rise to keying engagement between said engagers and the bar or wire portions to give a structurally sound joint.

Preferably, the method further comprises applying about the adjacent wire or bar portions at the desired joint or junction thereof settable material, which material is appled within the sleeve which serves as a material retaining sleeve, and when said material is caused or allowed to set affords a structurally sound joint between and over said adjacent portions.

A suitable injectable settable material may be introduced into the sleeve fitting via any of a plurality of holes, even valved ports, located in the sleeve fitting and also preferably serving as sight holes for checking injection. Preferably the sleeve fitting has sealing means at each end portion to prevent loss of settable material.

The present invention will now be described further, by way of example only, with reference to the accompanying drawings in which:

FIG. 1 is a plan view of a coupling according to one embodiment of the invention;

FIG. 2 is a section on line AA of FIG. 1 showing a longitudinal rib;

FIG. 3 is a section on line BB of the coupling with ribs in position;

FIG. 4 is a detail view of the profiled rib; and

FIGS. 5A, 5B, 5C, 5D and 5E shows other shapes of couplings.

Referring to the drawings a coupling fitting for use in securing together ends of reinforcing bars or wires for subsequent embedment in structural concrete, comprises a tubular sleeve 1 having an internal diameter such as to fit about end portions of bars or wires in spaced relation thereto. The sleeve has internal helical grooving 2, say 10 mm pitch. Holes 3, 4 are provided in the walls of the sleeve adjacent opposite ends, provided as sighting and/or filling hole as described further hereinafter. Nylon plugs 11 are provided to block the holes 3, 4 and are transparent to act as windows to see that resin is in place.

The sleeve is constructed symmetrically about its mid-point and in the illustrated embodiment has for each half, three threaded holes 5 through the wall for positively adjustable engagers, in the form of threaded screws or bolts 7 spaced along the coupling. These are preferably cap screws, and with reduced shanks as at 8 so that the head shears off at a predetermined torque on screwing in place. The end of the bolts 7 are so formed with indentation means 9 to penetrate into the bar or wires on doing up, either as a tapered point, or a convex or concave formation providing either a biting point or an annular biting edge.

In the illustrated embodiment, two longitudinal ribs 13 are provided acting as radial engagers with which the bar or wire portions abut in use. The ribs are spaced apart circumferentially by angle A, which is in the range of 0 to 180 degrees, preferably of the order of 120 degrees where just two ribs are provided. The ribs are positioned straddling the axis 15 of the positively adjustable engagers 7 and in the opposite half of the sleeve. In other embodiments, two or more pairs of ribs are provided.

In the illustrated embodiment the ribs run substantially the length of the sleeve, with soft tack welding 17 at each end which provides a convenient means of locating the ribs to the sleeve longitudinally and circumferentially during emplacement, which is often in a vertical orientation.

The ribs are profiled, preferably to both sides, either with the same profile to both sides or different. In the illustration one side is shown coarse and the other fine, by way of example only. We have found profiles with an aspect ratio x:y = 3:1 and x:y = 2:1 to be suitable, but this is not intended as limiting. In the illustrated embodiment (see FIG. 4) the profiling is formed by upstanding teeth having inclined flanks symmetrical about an axis perpendicular to the longitudinal axis of the profiled engagers. The profiling is shown diagrammatically in FIG. 2.

It will be understood by one skilled in the art that a typical reinforcing bar is formed both with diametrically opposed longitudinal ribbing and part helical ribs, with these to each half of the bar, as defined by the longitudinal ribbing, being inclined opposite to one another. Thus in providing mechanical keying means we are concerned to ensure both adequate contact and centring of the reinforcing bar in the sleeve. That centring is particularly important where resin is used additionally as a connecting medium.

The mechanical strength of the coupling depends to some extent on the positional relationship of the bar with respect to the radial engagers. In theory the best performance results where our profiled rib is aligned with the longitudinal rib of the bar, thus giving contact points all along the length of the rib. The other engager, then must contact along the helical ribbing of the bar. However, we have found that contact of both radial engagers with only the helical ribbing gives virtually the same mechanical performance. The ribs have a hardness in the range 250-400 Vickers, preferably 300 Vickers which is harder than the reinforcing bars so as to ensure adequate penetration.

In coupling bars or wires, the coupling sleeve is fitted over and about adjacent ends (butting up to one another for a straight sleeve) and the positive engagers done up so centring the bars within the sleeve and causing the radial engagers to key into the bars, also the sleeve where the ribs are profiled to both sides. The ends of the positively adjustable engagers also bite into the bars. The bolts 7 sheer off at the outer surface of the sleeve at a torque determined to give required cooperating engagement of the engagers with the bar and/or sleeve. Such an arrangement provides the required mechanical strength.

We further prefer applying a settable material over and about the adjacent end portions of the bars to be retained within the sleeve. When such material is set it also affords a structurally sound joint. The holes 3, 4 provide for injecting the settable material and/or as sighting holes.

The invention has been described with reference to a straight butt joint in which a straight sleeve is employed. This is probably the most common joint configuration, but the invention also extends to sleeve-like devices for coupling bars or wires at angles to one another, by suitable configuration of the sleeve to receive appropriately orientated ends of bars or wires. FIGS. 5A, 5B, 5C, 5D and 5E show by way of example couplings of T configuration (FIG. 5A), Y configuration (FIG. 5B), cross-formation (FIG. 5E), 45 degrees (FIG. 5D) and 90 degree bends (FIG. 5C). Each coupling has a reception bore 20 to receive a respective bar or wire shown at 22 and provided with the above described positively adjustable engagers 7 and radially spaced profiled ribs 13 for locating it over and about the respective bar or wire to be joined to other such bars or wires and is not described in further detail.

I claim:

1. A coupling fitting for making joints in reinforcing bars or wires for structural concrete, comprising a sleeve-like device having means for locating it over and about portions of said bars or wires adjacent said desired joint with clearance to said bar or wire portions, wherein the means for locating comprises, for each portion, engagers at radial spacings relative to axes of bars or wires to be joined, one of which engagers for each portion is positively adjustable at emplacement through the side wall of the device, and the other engagers comprise radially spaced longitudinal ribs profiled to key into the bars or wire portions, said profiling comprising teeth-like ridges and valleys alternatively spaced along the length of the rib and wherein at least the teeth-like ridges have a hardness greater than that of the bars or wire portions.

2. A coupling fitting according to claim 1 wherein the ribs comprise longitudinal strips.

3. A coupling fitting as claimed in claim 1 in which means is provided for physically maintaining the ribs at desired spacings.

4. A coupling fitting according to claim 3 wherein said means comprises welding to the sleeve.

5. A coupling fitting according to claim 1 wherein the engagers are in one or more pairs spaced at between 100 degrees and 180 degrees apart and symmetrically about the axis of the positively adjustable engager and opposite thereto.

6. A coupling fitting according to claim 1 in which said ribs are at two spaced positions within the circumference of the sleeve.

7. A coupling fitting according to claim 6 wherein the two ribs are positioned 120 degrees apart and symmetrically about the axis of the positively adjustable engager and in the opposite half of the sleeve.

8. A coupling fitting according to claim 1 where each rib is also profiled to key into the sleeve, said profiling also comprising teeth-like ridges and valleys alternately spaced along the length of the rib.

9. A coupling fitting according to claim 8 wherein the profiling comprises teeth with flanks angled symmetrically about a plane perpendicular and transverse to the longitudinal axis of the rib.

10. A coupling fitting according to claim 9 wherein the teeth are triangular as viewed from the side and have a base to height ratio in the range of 3:1 to 2:1.

11. A coupling fitting according to claim 1 wherein the ribs have a hardness greater than that of the reinforcing bar.

12. A coupling fitting according to claim 11 wherein the rib hardness is in the range of 250-400 vickers.

13. A coupling fitting according to claim 1 wherein the positively adjustable engagers each comprise a screw or bolt threaded through the wall of the sleeve.

14. A coupling fitting according to claim 1 in which the positively adjustable engagers are configured to bite into the bars or wires.

15. A coupling fitting according to claim 14 wherein said configuring comprises a point or biting edge.

16. A coupling fitting according to claim 13 wherein the bolts or screws are of shear-head type.

17. A coupling fitting according to claim 1 further comprising one or more bores in the sleeve for introducing resin and/or as sighting holes.

18. A coupling fitting according to claim 1 in which the ribs, for a straight sleeve, run substantially the length of the sleeve.

19. A coupling fitting according to claim 1 when configured to join said bars or wires at angles relative to one another.

20. A coupling fitting according to claim 19 comprising at least two reception bores for a respective bar or wire and which are disposed with their axes at angles to one another.

21. A method of coupling reinforcing bars or wires for subsequent embedment in concrete for structural purposes, the method comprising applying about adjacent bar or wire portions at a desired joint or junction a sleeve having locating means for its fitting about said portions in spaced relation thereto, the locating means comprising for each portion radially spaced engagers with at least one for each portion being positively adjustable through the side wall of the sleeve and others comprise radially spaced profiled longitudinal ribs, said profiling comprising teeth-like ridges and valleys alternately spaced along the length of the rib and wherein at least the teeth-like ridges have a hardness greater than that of the bars or wire portions and wherein at emplacement the sleeve is centered relative to each of said portions to be joined by adjustment of said at least one positively adjustable engagers to give rise to keying engagement between the said engagers and the bar or wire portions to give structurally sound joint.

22. A method according to claim 21 in which there is keying engagement between the sleeve and the bar or wire portions by way of the said engagers.

23. A method according to claim 21 further comprising applying about the adjacent wire or bar portions at the desired joint or junction thereof settable material, which material is applied within the sleeve which serves as a material retaining sleeve, and when said material is caused or allowed to set affords a structurally sound joint between the and over said adjacent portions.

24. A method according to claim 23 in which the settable material is introduced into the sleeve fitting via, any of a plurality of holes in the sleeve.

* * * * *